United States Patent
Kendra

(12) 
(10) Patent No.: US 7,379,869 B2
(45) Date of Patent: May 27, 2008

(54) VOICE EVALUATION FOR COMPARISON OF A USER'S VOICE TO A PRE-RECORDED VOICE OF ANOTHER

(76) Inventor: Kurz Kendra, 911 Smith Ave., Birmingham, MI (US) 48009

( * ) Notice: Subject to any disclaimer, the term of this patent is extended or adjusted under 35 U.S.C. 154(b) by 774 days.

(21) Appl. No.: 10/786,641

(22) Filed: Feb. 25, 2004

(65) Prior Publication Data

US 2004/0172246 A1      Sep. 2, 2004

Related U.S. Application Data

(60) Provisional application No. 60/450,937, filed on Feb. 28, 2003.

(51) Int. Cl.
 *G10L 15/00* (2006.01)
(52) U.S. Cl. .................. 704/246; 704/250; 704/270
(58) Field of Classification Search ............... 704/246, 704/250, 270
See application file for complete search history.

(56) References Cited

U.S. PATENT DOCUMENTS

| | | | | |
|---|---|---|---|---|
| 5,893,057 | A | * | 4/1999 | Fujimoto et al. ........... 704/246 |
| 2003/0028377 | A1 | * | 2/2003 | Noyes ........................ 704/258 |
| 2004/0215445 | A1 | * | 10/2004 | Kojima ........................ 704/9 |

* cited by examiner

*Primary Examiner*—Daniel Abebe
(74) *Attorney, Agent, or Firm*—Thomas E. Donohue; Dickinson Wright PLLC

(57) ABSTRACT

A method of comparing voice signatures is provided comprising selecting an original performance. The original performance is comprised of an original performance voice signature. A user impersonation of at least a portion of the original performance is recorded and a user impersonation voice signature is established. The user impersonation voice signature is electronically compared to the original performance voice signature. A graduated performance value is generated representative of the similarities between the original voice signature and the user impersonation voice signature. An entertainment application is based on the graduated performance value.

26 Claims, 4 Drawing Sheets

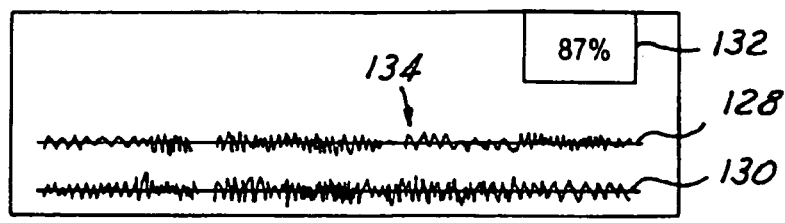
FIG.5
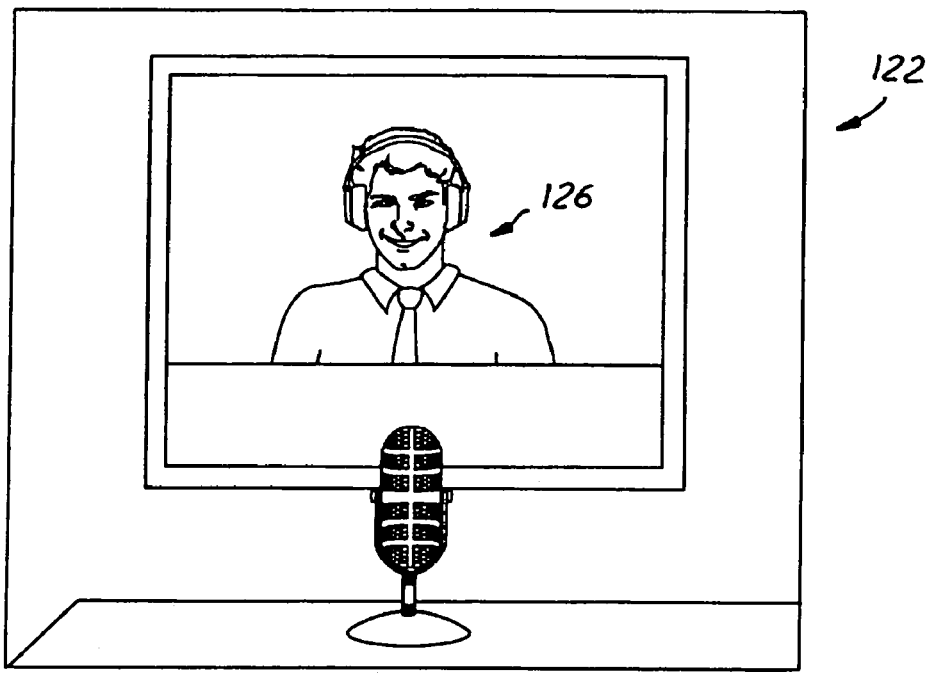
FIG.6
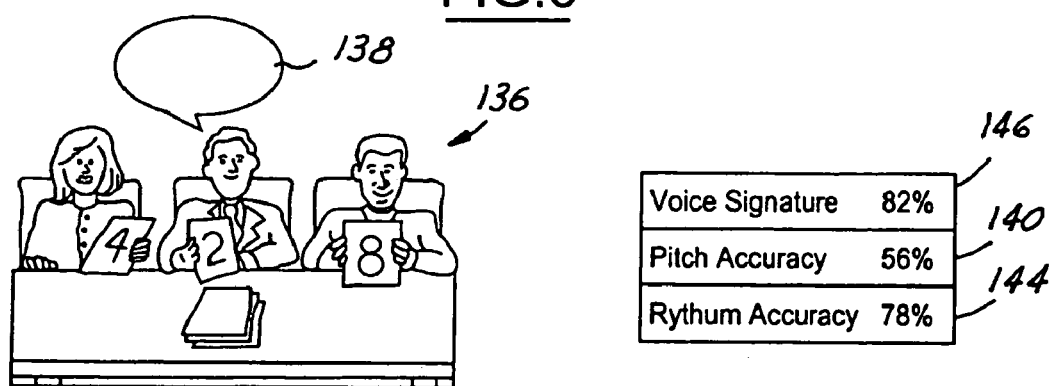
FIG.7
FIG.8

VOICE EVALUATION FOR COMPARISON OF A USER'S VOICE TO A PRE-RECORDED VOICE OF ANOTHER

CROSS-REFERENCE TO RELATED APPLICATIONS

This application claims priority from U.S. Provisional Patent Application Ser. No. 60/450,937 filed on Feb. 28, 2003.

TECHNICAL FIELD

The present invention relates generally to a system that compares a user's voice to a pre-recorded voice of another and generates a value representative of the similarities of the voices.

BACKGROUND OF THE INVENTION

Voice verification, or speaker verification, technology is typically employed to identify a speaker and is commonly employed to provide security access to buildings or applications. Voice verification technology is a biometric technology that has been developed and utilized for security purposes. The technology is based on the principle that every individual has unique voice characteristics. These unique voice characteristics allow for an identification of an individual based on the evaluation of a spoken phrase.

The technology is commonly employed by way of a user speaking a short phrase into a microphone. The phrase can be a familiar phrase, a password, or even the user's name. The sounds, frequencies, and physical characteristics of the voice track are then measured and determined. These elements are then utilized to establish a voiceprint or voice signature of the user's unique vocal pattern. This process is typically referred to as enrolling. Often the user is required to repeat the phrase several times in order to establish a reliable voice signature. The reliable voice signature is then stored in combination with the user's identity for use in security protocols.

These protocols are commonly referred to as a verification process. During the verification process, the speaker is asked to repeat the same phrase used during the enrolling process. The voice verification technology or algorithm compares the speaker's voice signature to the pre-recorded voice signature established during the enrollment process. The voice verification technology either accepts or rejects the speaker's attempt to verify the established voice signature. If the voice signature is verified, the user is allowed security access. If, however, the voice signature is not verified, the speaker is denied security access.

The aforementioned technology has been directed almost universally to security applications. The underlying principles, however, may be modified to provide a far more extensive field of use. Existing technologies are utilized to verify the identity of the speaker to provide finite user identity verification. An application developed to harness the technology in combination with graduated evaluation techniques would allow the technology to the widely implemented within the entertainment and marketing fields. This could provide large financial incentives to modify existing technologies.

It would, therefore, be highly desirable to have a voice evaluation system that could provide a graduated comparison of a user's voice to a pre-recorded voice of another such that the quality of a user impersonation could be quantized.

Similarly, it would be highly desirable to have such a voice evaluation system that could be implemented within an entertainment application.

SUMMARY OF THE INVENTION

A method of comparing voice signatures is provided comprising selecting an original performance. The original performance is comprised of an original performance voice signature. A user impersonation of at least a portion of the original performance is recorded and a user impersonation voice signature is established. The user impersonation voice signature is electronically compared to the original performance voice signature. A graduated performance value is generated representative of the similarities between the original voice signature and the user impersonation voice signature. An entertainment application is based on the graduated performance value.

Other features of the present invention will become apparent when viewed in light of the detailed description of the preferred embodiment when taken in conjunction with the attached drawings and appended claims.

BRIEF DESCRIPTION OF THE DRAWINGS

FIG. 5 is a detailed illustration of a voice signature comparison for use in the voice evaluation system illustrated in FIG. 1;

FIG. 6 is a detailed illustration of a recording studio display for use in the voice evaluation system illustrated in FIG. 1;

FIG. 7 is a detailed illustration of a judging panel display for use in the voice evaluation system illustrated in FIG. 1; and FIG. 8 is a detailed illustration of a evaluation report for use in the voice evaluation system illustrated in FIG. 1.

DESCRIPTION OF THE PREFERRED EMBODIMENT(S)

Figure 1:
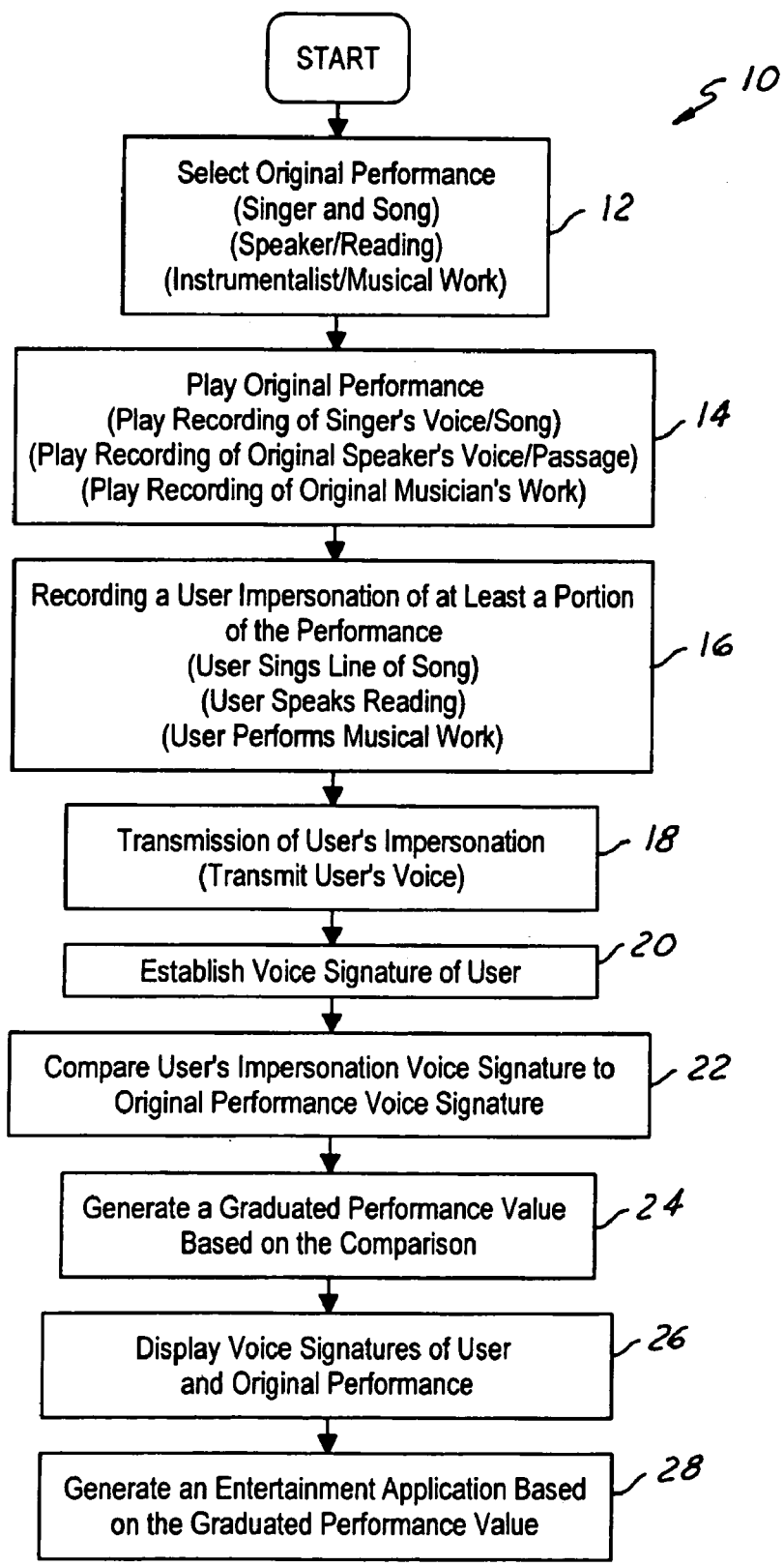
FIG. 1 is a schematic flow-chart illustration of the voice evaluation system of the present invention.

Referring now to FIG. 1, which is an illustration of a schematic flow-chart of the voice evaluation system 10 in accordance with the present invention. The voice verification system 10 is intended for in the detailed graduated comparison of a user's voice to the pre-recorded voice of another. It is contemplated that the present invention may be applicable to a wide variety of individual applications, although the present invention is intended for use in entertainment and educational applications.

Figure 3:
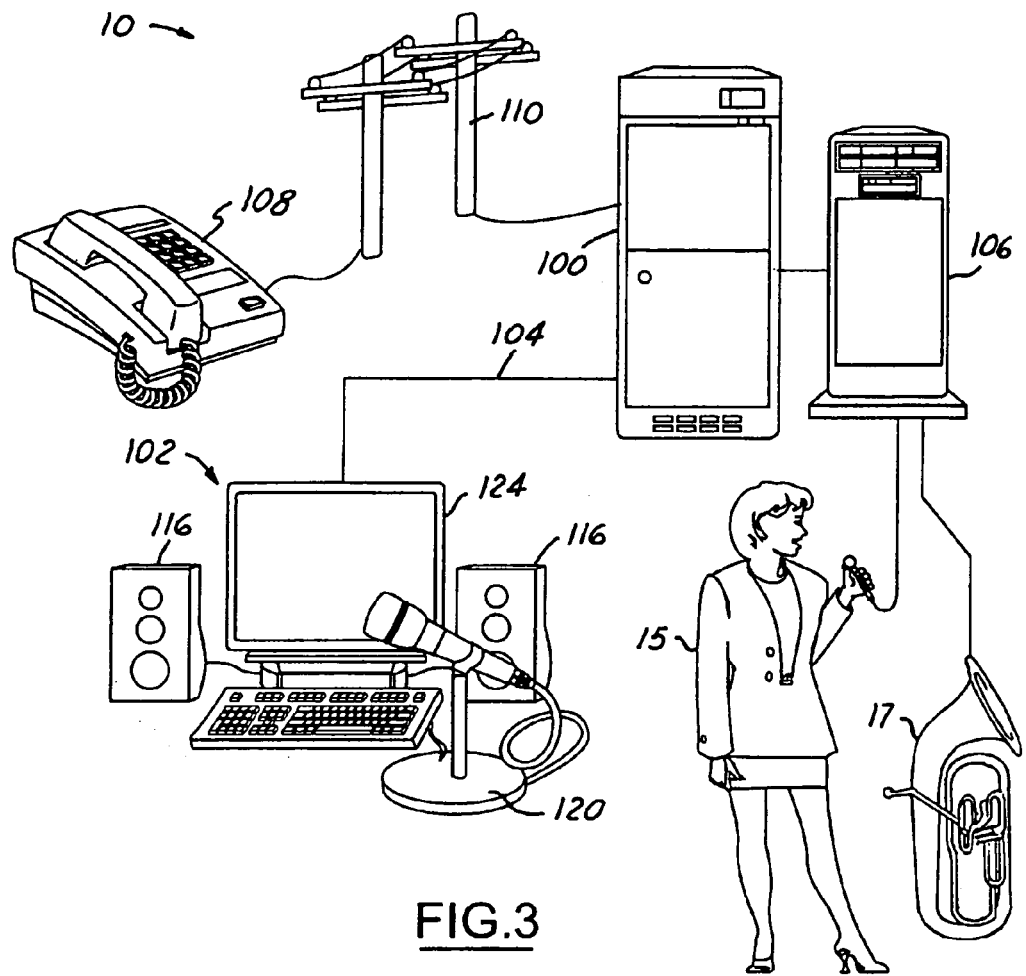
FIG. 3 is an illustration of an embodiment of a hardware arrangement for implementation of the voice evaluation system illustrated in FIG. 1.
Figure 4:
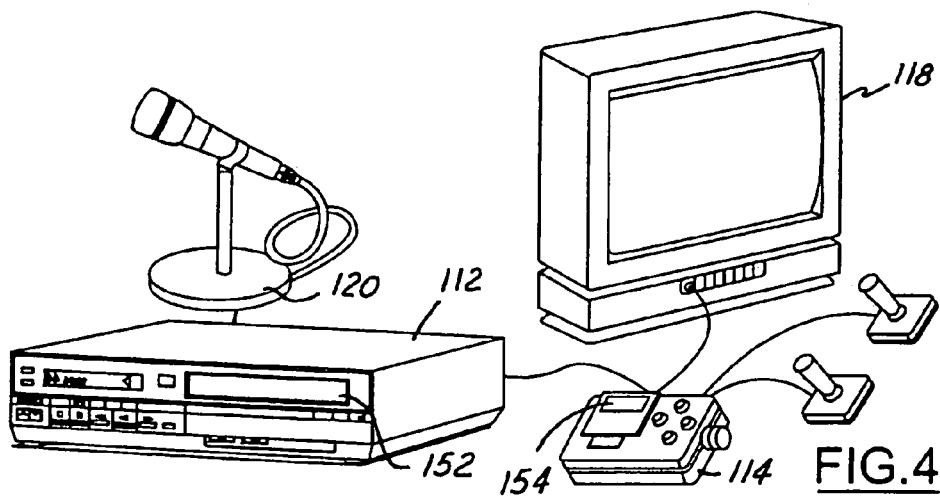
FIG. 4 is an illustration of an alternate embodiment of a hardware arrangement for implementation of the voice evaluation system illustrated in FIG. 1.

The voice evaluation system 10 includes the selection of an original performance 12. The original performance is intended to encompass a wide variety of individual performances such as singer/song, speaker/passage, character/phrase, or instrumentalist/performance for example. The original performance, however, is preferably a recording of a celebrity 15, professional musician 17, or well known voice such as a cartoon character. It is contemplated the each original performance comprises an original performance voice signature. It should be understood that a voice signature is intended in certain embodiments to comprise a instrumental voice such as the character of the sound emanating from a musical instrument. The original performance may additionally include an original performance pitch, an original performance rhythm, and a variety of other performance characteristics such as performance dynamics. It is contemplated that a user can access a plurality of such original performances in order to select a desired original performance. In one embodiment, the user can access a server (remote system) 100 in communication with the user's home computer 102 through a network 104, such as the Internet (see FIG. 3). The server 100 preferably includes a database 106 containing the plurality of original performances. Although a celebrity 108 may enter an original performance directly into the database 106, it is contemplated that well known recordings such as albums and compact discs may be utilized to build the database 106. The recordings in the database 106 are pre-recorded performances. Similarly, it is contemplated that in other embodiments, the database 106 and other software to control the voice evaluation system 10 may be installed or downloaded directly onto the home computer 102. In still another embodiment, it is contemplated that the voice evaluation system 10 and server 100 may be accessed through the use of a telephone 108 over phone lines 110. This widens the applicable audience and may increase the scope of the present invention to a wider base of applications. Finally, stand alone systems such as dvd/karaoke machines 112 or video game machines 114 may be used to deliver the voice evaluation system 10 to the user (see FIG. 4).

After selection of the original performance 12, the present invention preferably plays the original performance selected 14 for the user. This helps the user properly mentally visualize the original performance and assist in the impersonation. Playing of the original performance 14 can be accomplished through speakers 116 attached to the home computer 102, through the telephone 108, or through a monitor 118 attached to the karaoke 112 or video game machine 114. It should be understood, that while several delivery methods have been discussed for the voice evaluation system 10 many more derivation would be obvious to one skilled in the art in light of the present application.

The user is then encouraged to perform an impersonation of the original performance as the present invention records the user impersonation of at least a portion of the original performance 16. The user may be notified by a beep or other signal that the system 10 is ready to record the user's voice. The system can record the user's voice in a variety of fashions. The use of a microphone 120 attached to the computer 102, karaoke 112, or game machine 114 provides a simple but functional input methodology for capturing the user's voice. In other embodiments, the telephone 108 or similar input mechanism may be utilized instead. Although it is not contemplated that the user must sing/speak/perform the entire original performance it is contemplated that the present system 10 can real-time monitor the user's input such that the minimum length of input is achieved to perform sufficient vocal analysis. In at least one embodiment, a second beep or other signal may be used to notify the user that a sufficient length sample has been captured. The present invention also contemplates the use of a recording studio image 122 displayed on the monitor 124 of the computer 102 or other device during the user's input. This provides the user with the additional visual promotional cues to facilitate a better impersonation. In addition, the recording studio image 122 can include a real-time feedback element 126 such as an image of a recording studio employee that can provide the user with feedback relating to their on-going performance. In one example, the recording studio employee 126 may smile and/or give a thumbs up while the user is singing well and may grimace as the user may be recording a substandard performance. Again, this is an additional way to entertain the user and draw the best performance out of the user.

Once the user's voice is recorded, it is transmitted to a processor 18 wherein a user impersonated voice signature is generated 20. This is preferably accomplished within the remote system 100 although the software may be installed in local systems as well. The remote system 100 employs voice verification technology to compare the user impersonated voice signature 128 to the original performance voice signature 130 (see FIG. 5) 22. Based on the comparison of the two voice signatures 128,130 the present invention generates a graduated performance value 24 representative of the similarities between the two voice signatures 128,130. In one embodiment, it is contemplated that the graduated performance value 132 may be a percentage based numerical value (see FIG. 5). However, in other embodiments, the graduated performance value 132 may be a classification such as beginner, moderate, expert, professional, etc. rather than numerical in nature. It is contemplated that a waveform representation 134 of the two voice signatures 128,130 may be presented on the monitor 118 in combination with the graduated performance value 132 to give the user a visualization of their achieved impersonation skill 26.

Figure 2:
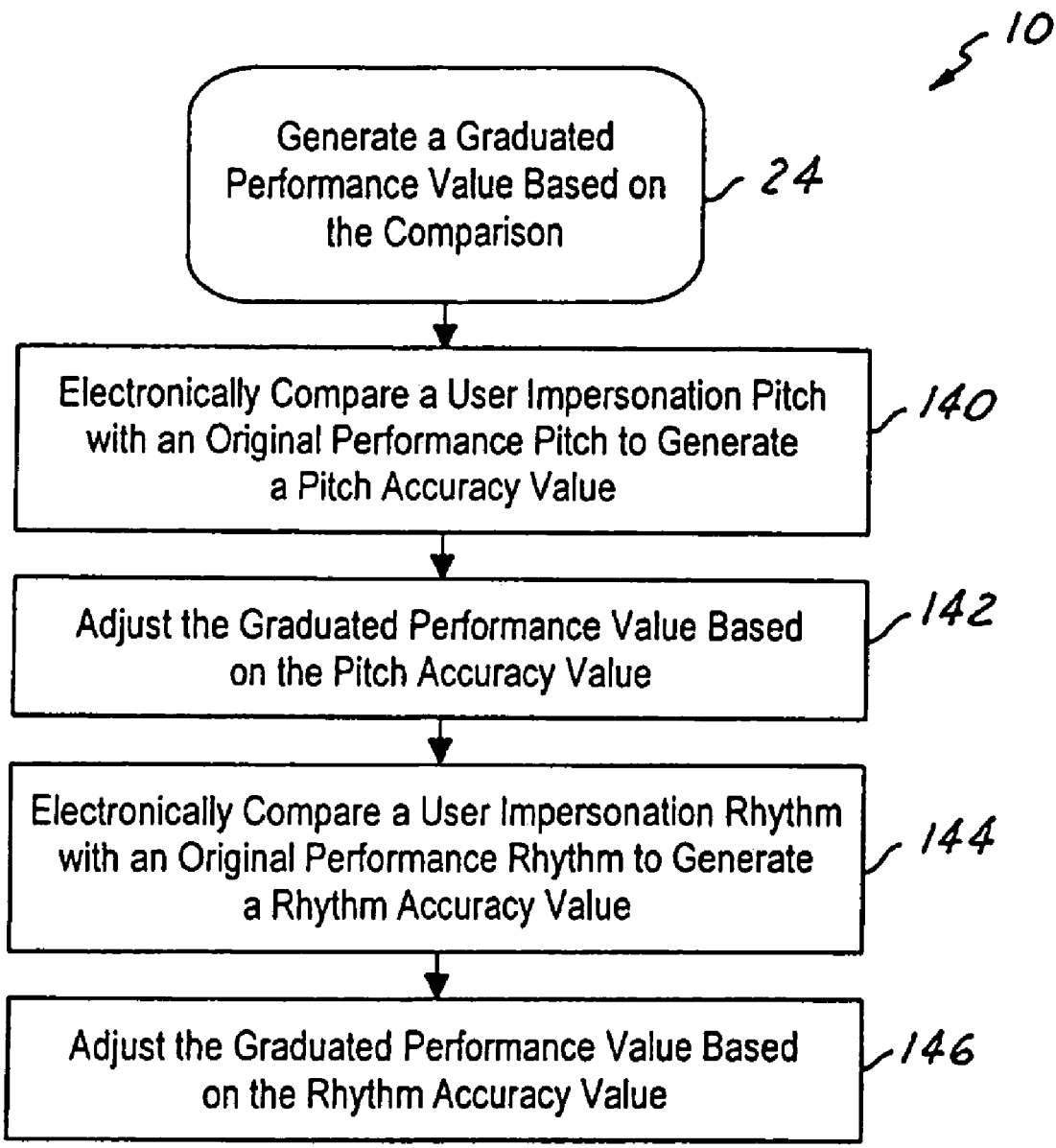
FIG. 2 is a detailed schematic flow-chart illustration of the voice evaluation system illustrated in FIG. 1.

In another embodiment, illustrated in FIG. 7, the system 10 can display a panel of fictionalized judges 136 from which to present the graduated performance value 132. In such an embodiment, it is contemplated that upon selection by the user of one of the fictionalized judges 136, a detailed comment on their performance 138 may be displayed. It is contemplated that the graduated performance value 132 may consider other factors in addition to the voice signatures 128,130. By electronically comparing a user impersonation pitch with an original performance pitch to generate a pitch accuracy value 140, the present invention can further adjust the graduated performance value 132. Similarly, by electronically comparing a user impersonation rhythm to the original performance rhythm to generate a rhythm accuracy value 144, the present invention can, in combination with the voice signature accuracy 146, further adjust the graduated performance value 132. (see FIGS. 2 and 8). This allows a more advanced evaluation of a user's impersonation especially when used for singing performances.

The present invention contemplates the use of the graduated performance value 132 as the basis of an entertainment applications 28. The entertainment application can be a contest, a sweepstakes, a game, or an educational singing or speaking application. If the entertainment application is a contest, prizes can be awarded for the user with the highest graduated performance value 132 indicating that the user has a voice most similar to the celebrity performing the original performance 130. The system 10 can also be a game used with promotional activities or advertising of a company. By way of example, a company's website could access the system 10 to allow a user to compare their voices to celebrity singers or cartoon characters associated with the company. In still another embodiment, a user's voice may be compared to a celebrity's voice along side comments for improving vocal singing or speaking as an educational tool.

In still another variation of the present invention, it is contemplated that the original performance is contemplated to comprise a instrumental performance. In such an embodiment, the original performance voice signature 130 is contemplated to encompass the musical characteristics of an instrumental performance. It is contemplated that the original performance voice signature 130 can be broken down into a plurality of characteristics that provide an instrumental performer with their unique character. These may include, but are not limited to, inflection, embouchure, intonation, dynamics, accents, variations, technique and flourishes. While these characteristics may be summed into a single original performance voice signature 130, they may also be broken down into subcategories for individualized analysis. Similarly, the rhythm accuracy 144 and pitch accuracy 140 may also be compared to arrive at the graduated performance value 132. Again, this could prove advantageous in the screening of potential musicians for performance groups or contests. Additionally, the present invention when applied to instrumental performances can serve as a remote music teaching device allowing automated tutorial lessons through the detailed comments on the performance 138. This could serve to bring music instruction to remote locations in addition to providing a measuring stick for budding musicians to compare their progress to their musical idols.

It should be understood that although a remote system 100 has been described in one embodiment, it is contemplated that the system 10 can be loaded onto any computer 102 or can be downloaded from a web site. Similarly, the system 10 may be stored on a karaoke dvd 152 or game software 154. In such scenarios the user's voice is stored and analyzed locally rather than at the remote system 100. The system 10 may also reside on a dvd or screensaver. Speech recognition technology can also be used to vocally command the system 10 to take certain actions.

While particular embodiments of the invention have been shown and described, numerous variations and alternative embodiments will occur to those skilled in the art. Accordingly, it is intended that the invention be limited only in terms of the appended claims.

What is claimed is:

1. A method of comparing voice signatures comprising:
    selecting an original performance, said original performance comprising an original performance voice signature;
    recording a user impersonation of at least a portion of said original performance;
    establishing a user impersonation voice signature;
    electronically comparing said user impersonation voice signature to said original performance voice signature;
    generating a graduated performance value representative of the similarities between said original voice signature and said user impersonation voice signature; and
    basing an entertainment application upon use of said graduated performance value.

2. A method of comparing voice signatures as described in claim 1, wherein said original performance comprises a spoken voice passage.

3. A method of comparing voice signatures as described in claim 1, wherein said original performance comprises a song.

4. A method of comparing voice signatures as described in claim 3, further comprising:
    electronically comparing a user impersonation pitch with a original performance pitch to generate a pitch accuracy value;
    generating said graduated performance value representative of said pitch accuracy value.

5. A method of comparing voice signatures as described in claim 3, further comprising:
    electronically comparing a user impersonation rhythm with a original performance rhythm to generate a rhythm accuracy value; and
    generating said graduated performance value representative of said rhythm accuracy value.

6. A method of comparing voice signatures as described in claim 1, wherein said original performance comprises an instrumental performance.

7. A method of comparing voice signatures as described in claim 5, wherein said original performance voice signature includes characteristics taken from the group of inflection, embouchure, intonation, dynamics, accents, variations, technique and flourishes.

8. A method of comparing voice signatures as described in claim 1, further comprising:
    playing said original performance.

9. A method of comparing voice signatures as described in claim 1, further comprising:
    generating a display of judges, said display of judges communicating said graduated performance value to said user.

10. A method of comparing voice signatures as described in claim 9, further comprising:
    providing a critique from at least one of said judges upon selection by said user.

11. A method of comparing voice signatures as described in claim 1, further comprising:
    displaying a recording studio on a display while recording said user impersonation voice signature.

12. A method of comparing voice signatures as described in claim 11, further comprising:
    providing an instantaneous feedback while recording said user impersonation voice signature.

13. A method of comparing voice signatures as described in claim 1, further comprising:
    displaying said original voice signature and said user impersonation voice signature on a display in a waveform display.

14. A method of comparing voice signatures as described in claim 1, further comprising:
    communicating said user impersonation over a computer network to a remote controller; and
    utilizing a logic on said remote controller to electronically compare said user impersonation voice signature to said original performance voice signature.

15. A method of comparing voice signatures as described in claim 1, further comprising:
    communicating said user impersonation over through a phone network to a remote controller; and
    utilizing a logic on said remote controller to electronically compare said user impersonation voice signature to said original performance voice signature.

16. A method of comparing voice signatures as described in claim 1, wherein said entertainment application comprises a contest between a plurality of users.

17. A method of comparing voice signatures as described in claim 1, wherein said entertainment application comprises a game between a plurality of users.

18. A method of comparing voice signatures as described in claim 1, further comprising:
    storing a plurality of said original performances within a database; and
    allowing said user to select said original performance from said database.

19. A method of comparing voice signatures as described in claim 18, further comprising:
storing said database on a remote controller.

20. A method of comparing voice signatures as described in claim 18, further comprising:
storing said database on a local system.

21. An apparatus for comparing voice signatures comprising:
a database comprising a plurality of original performances, each of said original performances comprising an original performance voice signature;
a microphone for recording a user impersonation of at least a portion of one of said original performance; and
a controller comprising logic adapted to:
establish a user impersonation voice signature;
compare said user impersonation voice signature to said original performance voice signature; and
generate a graduated performance value representative of the similarities between said original voice signature and said user impersonation voice signature.

22. An apparatus for comparing voice signatures as described in claim 21, wherein said logic is further adapted to:
receive said user impersonation over phone lines.

23. An apparatus for comparing voice signatures as described in claim 21, wherein said controller comprises an entertainment game device.

24. An apparatus for comparing voice signatures as described in claim 23, wherein said database comprises a removable game element.

25. An apparatus for comparing voice signatures as described in claim 21, wherein said original performance comprises an instrumental voice.

26. An apparatus for comparing voice signatures as described in claim 25, wherein said logic is further adapted to:
generate music lessons, from a remote system, using said comparison.

* * * * *